(12) United States Patent
Kimberley et al.

(10) Patent No.: US 7,705,095 B2
(45) Date of Patent: Apr. 27, 2010

(54) POLYMERISATION PROCESS

(75) Inventors: Brian Stephen Kimberley, Lyndhurst (GB); Gerard Lacane, Marignane (FR); Sergio Mastroianni, Etterbeek (BE)

(73) Assignee: Ineos Europe Limited, Hampshire (GB)

( * ) Notice: Subject to any disclaimer, the term of this patent is extended or adjusted under 35 U.S.C. 154(b) by 427 days.

(21) Appl. No.: 10/583,115

(22) PCT Filed: Dec. 8, 2004

(86) PCT No.: PCT/GB2004/005197

§ 371 (c)(1),
(2), (4) Date: Jun. 16, 2006

(87) PCT Pub. No.: WO2005/058978

PCT Pub. Date: Jun. 30, 2005

(65) Prior Publication Data

US 2007/0066773 A1 Mar. 22, 2007

(30) Foreign Application Priority Data

Dec. 18, 2003 (GB) ................. 0329348.7

(51) Int. Cl.
*C08F 4/64* (2006.01)
*C08F 4/52* (2006.01)
*C08F 2/00* (2006.01)

(52) U.S. Cl. .............. 526/74; 526/160; 526/170; 526/161; 526/172; 526/134; 526/129; 526/130; 526/901; 526/348; 502/118; 502/103; 502/104

(58) Field of Classification Search ......... 526/129, 526/128, 134, 160, 161, 170, 172, 901, 74, 526/75
See application file for complete search history.

(56) References Cited

U.S. PATENT DOCUMENTS 5,057,475 A * 10/1991 Canich et al. ............... 502/104
5,064,802 A * 11/1991 Stevens et al. ............... 502/155
5,332,706 A * 7/1994 Nowlin et al. ............... 502/107
5,405,922 A * 4/1995 DeChellis et al. ............ 526/68
5,688,734 A * 11/1997 Speca et al. ................ 502/108
5,721,184 A * 2/1998 Brinen et al. ............... 502/104
5,786,291 A * 7/1998 Speca et al. ................ 502/104
5,834,393 A * 11/1998 Jacobsen et al. ............ 502/152
6,777,366 B2 * 8/2004 Gauthier et al. ............. 502/117
7,528,090 B2 * 5/2009 Jacobsen et al. ............ 502/109

FOREIGN PATENT DOCUMENTS

WO WO 96/34020 A1 * 3/1996
WO WO 01/25296 A1 * 4/2001
WO WO 03/016362 A1 2/2003
WO WO 2005/019274 A1 * 3/2005

OTHER PUBLICATIONS

Kamfjord et al., Macromol. Rapid. Commun., 1998, 19(10), 505-509.*
Notification Concerning Transmittal of International Preliminary Report on Patentability, International Application No. PCT/EP2004/00517, Form PCT/IB/326, 4 pgs; mailed Jun. 29, 2006.

* cited by examiner

*Primary Examiner*—David Wu
*Assistant Examiner*—Rip A. Lee
(74) *Attorney, Agent, or Firm*—Nixon & Vanderhye

(57) ABSTRACT

A process for the polymerisation of olefin monomers selected from (a) ethylene, (b) propylene (c) mixtures of ethylene and propylene and (d) mixtures of (a), (b) or (c) with one or more other alpha-olefins is performed in a polymerisation reactor in the presence of a supported polymerisation catalyst characterised in that prior to injection into the reactor said supported polymerisation catalyst in the form of a powder is contacted with an inert hydrocarbon liquid in a quantity sufficient to maintain said catalyst in powder form. The preferred inert hydrocarbon liquid is hexane. The supported polymerisation catalyst is preferably a supported metallocene catalyst. According to the process of the prescrit invention the level of fines associated with the polymer products is reduced in particular the level of fines having a diameter<125 μm and microfines of diameter<50 μm.

14 Claims, No Drawings

POLYMERISATION PROCESS

This application is the U.S. National Phase of International Application PCT/GB2004/005197, filed 8 Dec. 2004, which designated the U.S. PCT/GB2004/005197 claims priority to British Application No. 0329348.7 filed 18 Dec. 2003. The entire content of these applications are incorporated herein by reference.

The present invention relates to a polymerisation process and in particular to polymerisation processes using supported polymerisation catalysts, in particular to supported polymerisation catalyst comprising metallocene complexes. The use of the supported polymerisation catalysts in the process of the invention leads to a reduction of fines on the resultant final polymer resins.

In recent years there have been many advances in the production of polyolefin homopolymers and copolymers due to the introduction of metallocene catalysts. Metallocene catalysts offer the advantage of generally a higher activity than traditional Ziegler catalysts and are usually described as catalysts which are single site in nature. There have been developed several different families of metallocene complexes. In earlier years catalysts based on bis(cyclopentadienyl) metal complexes were developed, examples of which may be found in EP 129368 or EP 206794. More recently complexes having a single or mono cyclopentadienyl ring have been developed. Such complexes have been referred to as 'constrained geometry' complexes and examples of these complexes may be found in EP 416815 or EP 420436. In both of these complexes the metal atom eg. zirconium is in the highest oxidation state.

Other complexes however have been developed in which the metal atom may be in a reduced oxidation state. Examples of both the bis(cyclopentadienyl) and mono(cyclopentadienyl) complexes have been described in WO 96/04290 and WO 95/00526 respectively.

The above metallocene complexes are utilised for polymerisation in the presence of a cocatalyst or activator. Typically activators are aluminoxanes, in particular methyl aluminoxane or compounds based on boron compounds. Examples of the latter are borates such as trialkyl-substituted ammonium tetraphenyl- or tetrafluorophenyl-borates. Catalyst systems incorporating such borate activators are described in EP 561479, EP 418044 and EP 551277.

The above metallocene complexes may be used for the polymerisation of olefins in solution, slurry or gas phase. When used in the slurry or gas phase the metallocene complex and/or the activator may be suitably supported. Typical supports include inorganic oxides eg. silica or polymeric supports may alternatively be used.

Examples of the preparation of supported metallocene catalysts for the polymerisation of olefins may be found in WO 94/26793, WO 95/07939, WO 96/00245, WO 96/04318, WO 97/02297 and EP 642536.

In gas phase polymerisation processes the presence of fines associated with the produced polymer resins can often result in operational problems such as fouling or agglomerate formation.

Supported catalysts for the polymerisation of olefins may be added to the polymerisation reactor in a number of suitable means.

Typically for example the catalyst may be added to the reactor in a slurry of a suitable solvent.

For example EP 776691 describes the addition of a dry catalyst powder into a gas phase polymerisation reactor in the form of a suspension of the powder in a liquid hydrocarbon.

Alternatively U.S. Pat. No. 4,610,574 describes the transfer of a dry catalyst into a reactor together with a hydrocarbon liquid whereby the catalyst is introduced as a mud which is described as being more dense and homogeneous than a catalyst slurry.

Alternatively the catalyst may be added to the reactor as a free flowing powder. Suitable means for introducing a catalyst into a reactor in the form of a free flowing powder are described in EP 628343, WO 00/07714 and EP 275675.

U.S. Pat. No. 6,319,995 describes a method of feeding a dry catalyst to a polymerisation reactor by flushing with an inert liquid hydrocarbon. The method is a particularly suited to liquid-filled polymerisation reactors.

We have now surprisingly found that by the addition of a small amount of an inert hydrocarbon liquid to the supported polymerisation catalyst in powder form prior to injection into the polymerisation reactor may result in a reduction in the level of fines associated with the final polymer resins.

Thus according to the present invention there is provided a process for the polymerisation of olefin monomers selected from (a) ethylene, (b) propylene (c) mixtures of ethylene and propylene and (d) mixtures of (a), (b) or (c) with one or more other alpha-olefins, said process performed in a polymerisation reactor in the presence of a supported polymerisation catalyst characterised in that prior to injection into the reactor said supported polymerisation catalyst in the form of a powder is contacted with an inert hydrocarbon liquid in a quantity sufficient to maintain said catalyst in powder form.

Suitable inert hydrocarbon liquids include lower alkanes or aromatic hydrocarbons.

A particularly preferred inert hydrocarbon liquid for use in the present invention is hexane.

The hydrocarbon liquid is preferably present in the supported catalyst in amount up to about 10% of the pore volume of the support.

By powder form is meant that the supported catalyst is without lumps or agglomerates and is free flowing.

Prior to contact with the liquid hydrocarbon the supported polymerisation catalyst is in the form of a free flowing powder.

The supported polymerisation catalyst preferably comprises (a) a support
(b) a transition metal compound, and
(c) an activator.

The most preferred support for use with the supported catalyst according to the present invention are inorganic metal oxides in particular oxides of aluminum, silicon, zirconium, zinc and titanium. Alumina, silica and silica-alumina are preferred metal oxides. Suitable silicas include Crosfield ES70, Davison 948 and Sylopol 948 silicas.

The support material may then be further subjected to a heat treatment and/or chemical treatment to reduce the water content or the hydroxyl content of the support material. Typically chemical dehydration agents are reactive metal hydrides, aluminum alkyls and halides. Prior to its use the support material may be subjected to treatment at 100° C. to 1000° C. and preferably at 200 to 850° C. in an inert atmosphere under reduced pressure.

The support material may be further combined with an organometallic compound preferably an organoaluminum compound and most preferably a trialkylaluminum compound in a dilute solvent.

The support material is pretreated with the organometallic compound at a temperature of −20° C. to 150° C. and preferably at 20° C. to 100° C.

Other suitable support materials include finely divided natural clays for example montmorillonite or bentonite.

Group IIa metal halides for example magnesium chloride or polymeric materials such as finely divided polyolefins for example finely divided polyethylene may also be suitable for use in the supported catalyst of the present invention.

Suitable transition metal compounds for use in the catalyst system of the present invention are those based on the late transition metals (LTM) of Group VIII for example compounds containing iron, nickel, manganese, ruthenium, cobalt or palladium metals. Examples of such compounds are described in WO 98/27124 and WO 99/12981 and may be illustrated by [2,6-diacetylpyridinebis(2,6-diisopropylanil)FeCl$_2$], 2,6-diacetylpyridinebis(2,4,6-trimethylanil)FeCl$_2$ and [2,6-diacetylpyridinebis(2,6-diisopropylanil)CoCl$_2$].

Other transition metal compounds include derivatives of Group IIIA, IVA or Lanthanide metals which are in the +2, +3 or +4 formal oxidation state. Preferred compounds include metal complexes containing from 1 to 3 anionic or neutral ligand groups which may be cyclic or non-cyclic delocalized π-bonded anionic ligand groups. Examples of such π-bonded anionic ligand groups are conjugated or non-conjugated, cyclic or non-cyclic dienyl groups, allyl groups, boratabenzene groups, phosphole and arene groups. By the term π-bonded is meant that the ligand group is bonded to the metal by a sharing of electrons from a partially delocalised π-bond.

Each atom in the delocalized π-bonded group may independently be substituted with a radical selected from the group consisting of hydrogen, halogen, hydrocarbyl, halohydrocarbyl, hydrocarbyl, substituted metalloid radicals wherein the metalloid is selected from Group IVB of the Periodic Table. Included in the term "hydrocarbyl" are C1-C20 straight, branched and cyclic alkyl radicals, C6-C20 aromatic radicals, etc. In addition two or more such radicals may together form a fused ring system or they may form a metallocycle with the metal.

Examples of suitable anionic, delocalised π-bonded groups include cyclopentadienyl, indenyl, fluorenyl, tetrahydroindenyl, tetrahydrofluorenyl, octahydrofluorenyl, etc. as well as phospholes and boratabenzene groups.

Phospholes are anionic ligands that are phosphorus containing analogues to the cyclopentadienyl groups. They are known in the art and described in WO 98/50392.

The boratabenzenes are anionic ligands that are boron containing analogues to benzene. They are known in the art and are described in Organometallics, 14, 1, 471-480 (1995).

The preferred transition metal compound is a bulky ligand compound also referred to as a metallocene complex containing at least one of the aforementioned delocalized π-bonded group, in particular cyclopentadienyl ligands. Such metallocene complexes are those based on Group IVB (CAS Version) metals for example titanium, zirconium and hafnium.

Metallocene complexes may be represented by the general formula:

LxMQn where L is a cyclopentadienyl ligand, M is a Group IVB metal, Q is a leaving group and x and n are dependent upon the oxidation state of the metal.

Typically the Group IVA metal is titanium, zirconium or hafnium, x is either 1 or 2 and typical leaving groups include halogen or hydrocarbyl. The cyclopentadienyl ligands may be substituted for example by alkyl or alkenyl groups or may comprise a fused ring system such as indenyl or fluorenyl.

Examples of suitable metallocene complexes are disclosed in EP 129368 and EP 206794. Such complexes may be unbridged eg. bis(cyclopentadienyl)zirconium dichloride, bis(pentamethyl)cyclopentadienyl dichloride, or may be bridged eg. ethylene bis(indenyl)zirconium dichloride or dimethylsilyl(indenyl)zirconium dichloride.

Other suitable bis(cyclopentadienyl)metallocene complexes are those bis(cyclopentadienyl)diene complexes described in WO 96/04290 Examples of such complexes are bis(cyclopentadienyl)zirconium (2,3-dimethyl-1,3-butadiene) and ethylene bis(indenyl)zirconium 1,4-diphenyl butadiene.

Examples of monocyclopentadienyl or substituted monocyclopentadienyl complexes suitable for use in the present invention are described in EP 416815, EP 418044, EP 420436 and EP 551277. Suitable complexes may be represented by the general formula:

CpMX$_n$ wherein Cp is a single cyclopentadienyl or substituted cyclopentadienyl group optionally covalently bonded to M through a substituent, M is a Group VIB (CAS Version) metal bound in a η$^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms or optionally one X together with Cp forms a metallocycle with M and n is dependent upon the valency of the metal.

Particularly preferred monocyclopentadienyl complexes have the formula:

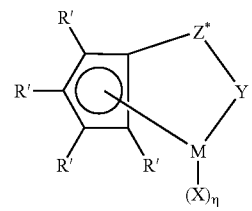

wherein:
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms, Y is —O—, —S—, —NR*—, —PR*—, M is hafnium, titanium or zirconium, Z* is SiR*$_2$, CR*$_2$, SiR*$_2$SIR*$_2$, CR*$_2$CR*$_2$, CR*=CR*, CR*$_2$SIR*$_2$, or GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system., and n is 1 or 2 depending on the valence of M.

Examples of suitable monocyclopentadienyl complexes are (tert-butylamido)dimethyl(tetramethyl-$\eta^5$-cyclopentadienyl)silanetitanium dichloride and (2-methoxyphenylamido)dimethyl(tetramethyl-$\eta^5$-cyclopentadienyl)silanetitanium dichloride.

Other suitable monocyclopentadienyl complexes are those comprising phosphinimine ligands described in WO 99/40125, WO 00/05237, WO 00/05238 and WO00/32653A typical examples of such a complex is cyclopentadienyl titanium [tri(tertiary butyl)phosphinimine]dichloride.

Another type of transition metal compound suitable for use in the present invention are monocyclopentadienyl complexes comprising heteroallyl moieties such as zirconium (cyclopentadienyl)tris(diethylcarbamates) as described in U.S. Pat. No. 5,527,752 and WO 99/61486.

Particularly preferred metallocene complexes for use in the catalyst system of the present invention may be represented by the general formula:

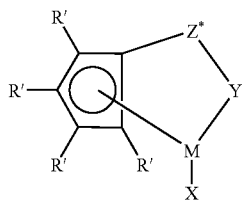

wherein:

R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a $\pi$-complex with M;

Y is —O—, —S—, —NR*—, —PR*—,

M is titanium or zirconium in the +2 formal oxidation state;

Z* is SiR*$_2$, CR*$_2$, SiR*$_2$SiR*$_2$, CR*$_2$CR*$_2$, CR*=CR*, CR*$_2$SiR*$_2$, or GeR*$_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

Examples of suitable X groups include s-trans-$\eta^4$-1,4-diphenyl-1,3-butadiene, s-trans-$\eta^4$-3-methyl-1,3-pentadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-bis(trimethylsilyl)-1,3-butadiene; s-cis-$\eta^4$-3-methyl-1,3-pentadiene; s-cis-$\eta^4$-1,4-dibenzyl-1,3-butadiene; s-cis-$\eta^4$-1,3-pentadiene; s-cis-$\eta^4$-1,4-bis(trimethylsilyl)-1,3-butadiene, said s-cis diene group forming a $\pi$-complex as defined herein with the metal.

Most preferably R' is hydrogen, methyl, ethyl, propyl, butyl, pentyl, hexyl, benzyl, or phenyl or 2 R' groups (except hydrogen) are linked together, the entire $C_5R'_4$ group thereby being, for example, an indenyl, tetrahydroindenyl, fluorenyl, terahydrofluorenyl, or octahydrofluorenyl group.

Highly preferred Y groups are nitrogen or phosphorus containing groups containing a group corresponding to the formula —N(R")— or —P(R")— wherein R" is $C_{1-10}$ hydrocarbyl.

Most preferred complexes are amidosilane—or amidoalkanediyl complexes.

Most preferred complexes are those wherein M is titanium.

Specific complexes suitable for use in the catalyst system of the present invention are those disclosed in WO 95/00526 and are incorporated herein by reference.

A particularly preferred complex for use in the present invention is (t-butylamido)(tetramethyl-$\eta^5$-cyclopentadienyl)dimethyl silanetitanium-$\eta^4$-1,3-pentadiene.

Suitable activators for use in the present invention are aluminoxanes or Group IIIA metal or metalloid compounds.

Aluminoxanes are well known as activators for metallocene complexes. Suitable aluminoxanes, for use in the catalyst system of the present invention, include polymeric or oligomeric aluminoxanes in particular methyl aluminoxane (MAO).

Preferred Group IIIA metal or metalloid compounds are those wherein the metal is boron.

Particularly preferred Group IIIA metal or metalloid compounds are fluorine containing Group IIIA metal or metalloid compounds.

Suitable boron compounds are triarylboron compounds, in particular perfluorinated triarylboron compounds.

A particularly preferred triarylboron compound is tris(pentafluorophenyl)borane (FAB).

Preferred Group IIIA metal or metalloid compounds suitable as activators for use in the present invention are ionic compounds comprising a cation and an anion.

The cation is typically a Bronsted acid capable of donating a proton and the anion is typically a compatible non-coordinating bulky species capable of stabilizing the cation.

Such activators may be represented by the formula:

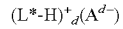

wherein

L* is a neutral Lewis base $(L^*-H)^+_d$ is a Bronsted acid $A^{d-}$ is a non-coordinating compatible anion of a Group IIIA metal or metalloid having a charge of d$^-$, and d is an integer from 1 to 3.

The cation of the ionic compound may be selected from the group consisting of acidic cations, carbonium cations, sylium cations, oxonium cations, organometallic cations and cationic oxidizing agents.

Suitably preferred cations include trihydrocarbyl substituted ammonium cations eg. triethylammonium, tripropylammonium, tri(n-butyl)ammonium and similar. Also suitable are N,N-dialkylanilinium cations such as N,N-dimethylanilinium cations.

The preferred ionic activators used as activators are those wherein the cation of the ionic activator comprises a hydrocarbyl substituted ammonium salt and the anion comprises an aryl substituted borate.

Typical borates suitable as ionic activators include:

triethylammonium tetraphenylborate
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate, N,N-dimethylanilinium tetrakis(pentafluorophenyl)borate,
N,N-diethylanilinium tetrakis(pentafluorphenyl)borate.

Particularly suitable activators of this type are those ionic activators comprising a cation and an anion wherein the anion has at least one substituent comprising a moiety having an active hydrogen, Suitable activators of this type are described in WO 98/27119 the relevant portions of which are incorporated herein by reference.

Examples of this type of anion include:
triphenyl(hydroxyphenyl)borate
tri(p-tolyl)(hydroxyphenyl)borate
tris(pentafluorophenyl)(hydroxyphenyl)borate
tris(pentafluorophenyl)(4-hydroxyphenyl)borate Examples of suitable cations for this type of activator include triethylammonium, triisopropylammonium, diethylmethylammonium, dibutylethylammonium and similar.

Particularly suitable are those cations having longer alkyl chains such as dihexyldecylmethylammonium, dioctadecylmethylammonium, ditetradecylmethylammonium, bis(hydrogenated tallow alkyl)methylammonium and similar.

Particular preferred activators of this type are alkylammonium tris(pentafluorophenyl) 4-(hydroxyphenyl)borates. A particularly preferred activator is bis(hydrogenated tallow alkyl)methyl ammonium tris(pentafluorophenyl)(4-hydroxyphenyl)borate.

The method of preparation of the supported catalyst systems of the present invention may comprise the addition of each component of the catalyst system in any order.

The preferred method of preparation of the supported catalyst systems of the present invention comprises
(a) treatment of the support with an activator, and
(b) addition of a transition metal compound.

Suitable supported catalyst systems for use in the process of the present invention are those described in published applications WO 04/018530, WO 04/018531, WO 04/020487, WO 04/055062 and WO 04/055063.

The present invention is also suitable for use with traditional Ziegler Natta polymerisation catalyst systems wherein the support material is an inorganic metal oxide for example silica or an inorganic metal halide for example $MgCl_2$.

Suitable transition metal compounds include those from Groups IVB-VIB (CAS Version), in particular compounds based on titanium compounds of formula $MR_x$ where M is titanium and R is halogen or a hydrocarbyloxy group and x is the oxidation state of the metal. Such conventional type catalysts include $TiCl_4$, $TiBr_4$, $Ti(OEt)_3Cl$, $Ti(OEt)_2Br_2$ and similar.

Traditional Ziegler Natta catalysts are described in more detail in "Ziegler-Natta Catalysts and Polymerisation" by J. Boor, Academic Press, New York, 1979.

Vanadium based catalysts include vanadyl halides eg. $VCl_4$, and alkoxy halides and alkoxides such as $VOCl_3$, $VOCl_2(OBu)$, $VCl_3(OBu)$ and similar.

Other conventional transition metal compounds are those based on magnesium/titanium electron donor complexes described for example in U.S. Pat. No. 4,302,565.

Particularly suitable transition metal compounds are those described in WO 9905187 and EP 595574.

Suitable organometallic compounds for use as activators for use with this type of transition metal compound are organoaluminium compounds for example trialkylaluminium compounds.

A preferred trialkylaluminium compound is triethylaluminium.

The process according to the present invention is suitable for polymerisation carried out in slurry or gas phase.

The present invention is however particularly suitable for use for the polymerisation of olefins carried out in the gas phase.

A slurry process typically uses an inert hydrocarbon diluent and temperatures from about 0° C. up to a temperature just below the temperature at which the resulting polymer becomes substantially soluble in the inert polymerisation medium. Suitable diluents include toluene or alkanes such as hexane, propane or isobutane. Preferred temperatures are from about 30° C. up to about 200° C. but preferably from about 60° C. to 100° C. Loop reactors are widely used in slurry polymerisation processes.

Gas phase processes for the polymerisation of olefins, especially for the homopolymerisation and the copolymerisation of ethylene and α-olefins for example 1-butene, 1-hexene, 4-methyl-1-pentene are well known in the art.

Typical operating conditions for the gas phase are from 20° C. to 100° C. and most preferably from 40° C. to 85° C. with pressures from subatmospheric to 100 bar.

Particularly preferred gas phase processes are those operating in a fluidised bed. Examples of such processes are described in EP 89691 and EP 699213 the latter being a particularly preferred process for use with the supported catalysts of the present invention.

Particularly preferred polymerisation processes are those comprising the polymerisation of ethylene or the copolymerisation of ethylene and α-olefins having from 3 to 10 carbon atoms.

By use of the process according to the present invention, the addition of the inert hydrocarbon liquid to the supported polymerisation catalyst in powder form prior to injection into the polymerisation reactor may result in a reduction in the level of fines associated with the final polymer resins.

This according to another aspect of the present invention there is provided a method for the reduction of fines associated with a polymer product obtained by the polymerisation of olefin monomers selected from (a) ethylene, (b) propylene (c) mixtures of ethylene and propylene and (d) mixtures of (a), (b) or (c) with one or more other alpha-olefins performed in a polymerisation reactor in the presence of a supported polymerisation catalyst, said method comprising contacting said supported polymerisation catalyst in powder form prior to injection into the reactor with an inert hydrocarbon liquid in quantity sufficient to maintain said catalyst in powder form.

In particular the level of fines comprising particles of diameter<1.25 μm or microfines of diameter<50 μm may be reduced.

The present invention will now be further illustrated with reference to the following examples:

Abbreviations
TEA triethylaluminium
Ionic Activator A [N(H)Me($C_{18}H_{37}$)$_2$][B($C_6F_5$)$_3$(p-OH$C_6H_4$)]
Complex A ($C_5Me_4SiMe_2N^tBu$)Ti($\eta^4$-1,3-pentadiene)

EXAMPLE 1

Passivation of Silica

To a suspension of 60 g of silica (Grace-Davison 948), previously calcined at 250° C. for 5 hours under nitrogen, in 600 ml of hexane was added 122.5 ml of a hexane solution of triethylaluminium (TEA) (0.98 mol/l). After two hours at 30° C. the liquid phase was decanted and then silica was washed 5 times with 500 ml of hexane and then dried at 60° C. under vacuum. The aluminum content was 1.44 mmol/g support.

Drying of the Ionic Activator A Solution

A solution of the Ionic Activator A in toluene (10.66% wt) was dried by prolonged contact (1 week) with molecular sieve-4A (25% wt/wt) which had previously been dried at 250° C. for 2 days and cooled to ambient temperature under nitrogen atmosphere.

Catalyst Preparation 1.54 ml of the above solution of the dried ionic activator A was reacted with 0.25 ml TEA in toluene (0.25 mol/l) (molar ratio Al/B=0.5). 4 g of the passivated silica was slowly impregnated (15 min) with this solution and manually agitated until no lumps were visible followed by 30 min holding. 0.70 ml of a solution of the Complex A in heptane (9.17% wt) was then slowly added (15 min) and manually agitated until no lumps were visible followed by 30 min holding. 11 ml of TEA solution in hexane (5 mmol/l) was then added and the suspension was stirred for 15 minutes. The resultant catalyst was washed 3 times with 35 ml of hexane and then dried under vacuum to give a loading of [Ti]=29 μmol/g; [Al]=1.33 mmol/g 2 g of the prepared catalyst was impregnated with 0.315 ml hexane. The catalyst was then shaken until no lumps were visible and then used for the copolymerisation of ethylene and 1-hexene under the following polymerisation conditions:

Polymerisation Data

A 2.5 l double jacketed thermostatic stainless steel autoclave was purged with nitrogen at 70° C. for at least one hour. 150 g of PE pellets previously dried under vacuum at 80° C. for 12 hours were introduced and the reactor was then purged three times with nitrogen (7 bar to atmospheric pressure). ~0.13 g of TEA treated silica (1.5 mmol TEA/g) was added under pressure and allowed to scavenge impurities for at least 15 minutes under agitation. The gas phase was then composed (addition of ethylene, 1-hexene and hydrogen) and a mixture of supported catalyst (~0.1 g) and silica/TEA (~0.1 g) was injected. A constant pressure of ethylene and a constant pressure ratio of ethylene/co-monomer were maintained during the run. The run was terminated by venting the reactor and then purging the reactor 3 times with nitrogen. The PE powder produced during the run was then separated from the PE seed bed by simple sieving.

Polymerisation Conditions
PC2=6.5 bar
C6/C2 (% vol)=0.4002
H2/C2 (% vol)=0.4316
T=70° C.
Catalyst added=0.092 g
Time=60 min.

The average activity was 55 g/ghb with a peak activity of 310 g/ghb.

The particle size distribution of the polymer resin was analysed by Malvern as follows:
Average particle size=474 μm
% volume<125 μm=1.04
% volume<50 μm=0.4

Analysis of the results indicated that although the average activity was not overtly affected the peak activity was decreased. The level of fines (particles<125 μm diameter) and microfines (particles<50 μm diameter) was in the order of 50% less than that expected when using an untreated catalyst.

The invention claimed is:

1. A process for the polymerisation of olefin monomers selected from the group consisting of (a) ethylene, (a) propylene (c) mixtures of ethylene and propylene and (d) mixtures of (a), (b) or (c) with one or more other alpha-olefins, said process comprising performing said polymerization in a polymerisation reactor in the presence of a supported polymerisation catalyst wherein prior to injection into the reactor said supported polymerisation catalyst in the form of a powder is contacted with an inert hydrocarbon liquid in a quantity sufficient to maintain said catalyst in powder form, and wherein the inert hydrocarbon liquid is a lower alkane and is present in an amount up to about 10% of the pore volume of the support.

2. A process according to claim 1 wherein the inert hydrocarbon liquid is hexane.

3. A process according to claim 1 wherein the Supported polymerisation catalyst comprises
(a) a support,
(b) a transition metal compound, and
(c) an activator.

4. A process according to claim 3 wherein the support is an inorganic metal oxide.

5. A process according to claim 4 wherein the support is silica.

6. A process according to claim 3 wherein the transition metal compound is a metallocene.

7. A process according to claim 6 wherein the metallocene has the formula:

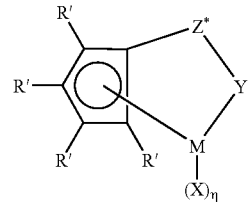

wherein:
R' each occurrence is independently selected from the group consisting of hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is hydride or a moiety selected from the group consisting of halo, alkyl, aryl aryloxy, alkoxy, alkoxyalkyl, amidoalkyl and siloxyalkyl having up to 20 non-hydrogen atoms and neutral Lewis base ligands having up to 20 non-hydrogen atoms, Y is —O—, —S—, —NR*—, PR*—, M is hafnium, titanium or zirconium, Z* is SiR*$_2$, CR*$_2$, SiR*$_2$SIR*$_2$, CR*$_2$CR*$_2$, CR*=CR*, CR*$_2$SIR*$_2$, or GeR*$_2$, wherein:

R* each occurrence is independently hydrogen, or a member selected from the group consisting of hydrocarbyl, silyl, halogenated alkyl, halogenated aryl, and combinations thereof, said
R* having up to 10 non-hydrogen atoms, and optionally, two R* groups from Z* (when R* is not hydrogen), or an R* group from Z* and an R* group from Y form a ring system, and n is 1 or 2 depending on the valence of M.

8. A process according to claim 6 wherein the metallocene has the formula:

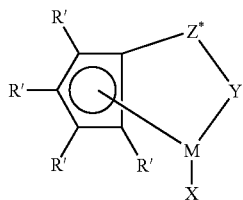

wherein:
R' each occurrence is independently selected from the group consisting of hydrogen, hydrocarbyl, silyl germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a π-complex with M;

Y is —O—, —S—, —NR*—, —PR*—,

M is titanium or zirconium in the +2 formal oxidation state;

Z* is SiR*$_2$, CR*$_2$, SiR*$_2$SiR*$_2$, CR*$_2$CR*$_2$, CR*=CR*, CR*$_2$SiR*$_2$, or GeR*$_2$, wherein:
R* each occurrence is independently hydrogen, or a member selected from the group consisting of hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

9. A process according to claim 3 wherein the activator has the formula

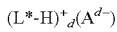

wherein
L* is a neutral Lewis base
(L*-H)$^+_d$ is a Bronsted acid
A$^{d-}$ is a non-coordinating compatible anion of a Group IIIA metal or metalloid having a charge of d$^-$, and
d is an integer from 1 to 3.

10. A process according to claim 9 wherein the activator comprises a cation and an anion wherein the anion has at least one substituent comprising a moiety having an active hydrogen.

11. A process according to claim 1 carried out in the gas phase.

12. A process according to claim 11 operating in a fluidized bed reactor.

13. A method for the reduction of fines associated with a polymer product obtained by the polymerisation of olefin monomers selected from the group consisting of (a) ethylene, (b) propylene (c) mixtures of ethylene and propylene and (d) mixtures of (a), (b) or (c) with one or more other alpha-olefins performed in a polymerisation reactor in the presence of a supported polymerisation catalyst, said method comprising contacting said supported polymerisation catalyst in powder form prior to injection into the reactor with an inert hydrocarbon liquid in a quantity sufficient to maintain said catalyst in powder form, wherein the inert hydrocarbon liquid is a lower alkane and is present in an amount up to about 10% of the pore volume of the support.

14. A method according to claim 13 wherein the level of fines comprising particles of diameter <125 μm and microfines of diameter <50 μm is reduced.

* * * * *